United States Patent [19]

Chapin

[11] Patent Number: 4,503,502
[45] Date of Patent: Mar. 5, 1985

[54] METHOD AND APPARATUS FOR AUTOMATED CHINESE STIR-FRY COOKING

[76] Inventor: Roger A. Chapin, 715 Boyd Rd., Pleasant Hill, Calif. 94523

[21] Appl. No.: 432,333

[22] Filed: Jun. 3, 1983

[51] Int. Cl.³ .................. G06F 15/20; G06G 7/48; A47J 27/00
[52] U.S. Cl. .................. 364/400; 99/328; 99/329 R; 99/333; 99/335; 99/348; 364/477
[58] Field of Search .......... 364/400, 477, 557; 219/490, 491, 494, 413; 99/325, 326, 327, 328, 329 R, 329 P, 330, 333, 335, 348

[56] References Cited

U.S. PATENT DOCUMENTS

| | | | |
|---|---|---|---|
| 3,827,345 | 8/1974 | Willson | 99/325 |
| 3,884,135 | 5/1975 | Löhr et al. | 99/348 |
| 3,945,309 | 3/1976 | Moran | 99/348 |
| 3,986,443 | 10/1976 | Shimizu | 99/334 |
| 4,173,925 | 11/1979 | Leon | 99/348 |
| 4,195,558 | 4/1980 | Speakman | 99/325 |
| 4,197,581 | 4/1980 | Watrous et al. | 364/400 |
| 4,289,064 | 9/1981 | Rosenblatt | 99/334 |
| 4,301,509 | 11/1981 | Haase et al. | 364/557 |
| 4,301,717 | 11/1981 | Knees | 99/348 |
| 4,304,177 | 12/1981 | Loeffler et al. | 99/333 |
| 4,320,285 | 3/1982 | Koether | 219/447 |
| 4,331,068 | 5/1982 | Asami | 99/325 |
| 4,437,159 | 3/1984 | Waugh | 364/400 |
| 4,459,449 | 7/1984 | Hirata | 99/325 |

Primary Examiner—Jerry Smith
Assistant Examiner—John R. Lastova

[57] ABSTRACT

A method and apparatus by which an operator without Chinese cooking skills or knowledge can cook consistent, superior Chinese stir-fry dishes with higher productivity and with a wider repertoire of recipes than that of the traditional Chinese chef. This invention includes means for entering and storing recipe data in a computer control system, means for selecting a recipe from a displayed menu, and means for cooking the selected recipe automatically by the computer control system including addition of food and liquid ingredients at proper intervals, temperature control throughout the cooking process, stirring of the cooking food, and timing of the cooking process, all according to the recipe selected.

9 Claims, 9 Drawing Figures

RECIPE WORKSHEET

NAME OF RECIPE  CHICKEN WITH VEGETABLES

INITIAL COOKING TEMPERATURE  350 °F

RECIPE

| # | Item | Qty | Unit | Time |
|---|------|-----|------|------|
| 1 | OIL | 3 | TBS | 20 |
| 2 | FOOD |  | 30 |  |
| 3 | FOOD |  | 30 |  |
| 4 | FOOD |  | 15 |  |
| 5 | TEMP | 325 |  |  |
| 6 | BROTH | 4 | TBS | 30 |
| 7 | SOY | 1 | TBS | 0 |
| 8 | SHERRY | 1 | TBS | 0 |
| 9 | STARCH | 1 | TBS | 0 |
| 10 | SESAME | 2 | TSP | 0 |
| 11 | OYSTER | 2 | TBS | 30 |
| 12 | END |  |  |  |

COMMENTS add 1 TBS oil, heat 20 secs
add first food ingredient, chicken, cook 30 secs
add second food ingredient, bok choy; cook 15 secs
add third food ingredient, sugar peas; cook 5 secs
reduce temperature to 325°
add 4 TBS chicken broth, cook 30 secs
add 1 TBS soy sauce
add 1 TBS sherry
add 1 TBS liquid cornstarch
add 2 TSP sesame oil
add 2 TBS oyster sauce and cook 30 secs
end of recipe

ABBREVIATIONS

FOOD – ADD FIRST OR NEXT FOOD INGREDIENT IN TRAY
BROTH – ADD CHICKEN BROTH
OIL – ADD COOKING OIL
OYSTER – ADD OYSTER SAUCE
SESAME – ADD SESAME OIL
SHERRY – ADD SHERRY
SOY – ADD SOY SAUCE
STARCH – ADD LIQUID CORN STARCH

TSP – TEASPOON
TBS – TABLESPOON
TEMP – RAISE OR LOWER COOKING TEMPERATURE
END – END OF RECIPE

FIG. 6

METHOD AND APPARATUS FOR AUTOMATED CHINESE STIR-FRY COOKING

BACKGROUND OF THE INVENTION

This invention relates to Chinese cooking and specifically to a method and apparatus that a restaurant might use for automated Chinese stir-fry cooking which does not require the operator to possess knowledge or skills in the art of Chinese stir-fry cooking. This invention incorporates steps including entering and storing recipe data, selection of a recipe from a menu, addition of food and liquid ingredients at the proper intervals, temperature control throughout the cooking process, stirring of the cooking food, and timing of the cooking process, all performed automatically by a computer control system.

DESCRIPTION OF PRIOR ART

Chinese stir-fry cooking is the brisk cooking of small cuts of meats and vegetables in hot oil over intense heat, calling for split-second timing and swift movements in an uninterrupted rhythm. It is the most common method of cooking Chinese food and means literally "toss-cooked". Two elements are crucial to stir-frying. Firstly, thorough organization, in the sense that everything needed is within reach so no interruption will disturb the cooking once it starts; and secondly, vigilance from the chef who must be ready to measure and add ingredients, and adjust timing and volume of heat instantly. Each dish is allowed to cook for only one to four minutes. This cooking process requires considerable skill with the chef judging the progress of the dish by the smell, look and feel of the food and the sound of the cooking. Each order is cooked individually. At the completion of the cooking process, the chef scoops the cooked food onto a serving dish, cleans the cooking pan, and prepares to cook the next order. Because of the required knowledge and skill, many Chinese chefs begin their training at a young age and specialize in a regional style of cooking such as Cantonese or Szechwanese. Virtually all Chinese restaurants are operated by Chinese families who compete for the good chefs. J. B. Bakos, Editor of the trade magazine *Restaurant Business*, has written: "It is interesting to note that we have not seen the development of a Chinese restaurant chain". One reason for this is that a good Chinese restaurant is dependent on its chef, and a chef's span of control rarely exceeds one restaurant. Were there a way to capture and multiply the knowledge and the skills of a good Chinese chef, a whole new opportunity would be created for expansion in the Chinese restaurant industry.

BRIEF SUMMARY OF THE INVENTION

Accordingly, several objects of this invention are: (1) to provide a method and apparatus by which an operator without Chinese cooking skills or knowledge can cook consistent, superior Chinese stir-fry dishes, (2) to increase the level of productivity over that of even the skilled Chinese chef by allowing the operator of this invention to cook several dishes concurrently, (3) to provide for cooking a wider range of regional stir-fry dishes than is commonly found in the repertoire of the traditional Chinese chef, to include the styles of Canton, Hunan, Peking, Shanghai and Szechwan. Further objects and advantages of this invention will become apparent from a consideration of the drawings and descriptions which follow.

The method and apparatus of this invention include the following interrelated components:

(a) a Chinese stove with gas burner;

(b) a wok with means for rotation about its vertical axis during the cooking process; as used in this description and in the appended claims, the term "wok" means a bowl-shaped cooking pan;

(c) a food tray with a rotatable divider for holding and dispensing food ingredients into the wok in predetermined time sequences;

(d) a spatula with driving means for stirring and tossing the food as it cooks;

(e) a plurality of liquid dispensers for holding and dispensing liquid ingredients into the wok in predetermined quantities and in predetermined time sequences;

(f) a temperature measuring component for measuring the temperature of the wok throughout the cooking process;

(g) a gas valve for controlling a supply of gas to the gas burner;

(h) a computer control system for storing, displaying and processing recipe information, for activating and deactivating the means to rotate the wok, the means to drive the spatula, the means to rotate the rotatable divider of the food tray, for activating and deactivating the plurality of liquid dispensers, for activating and deactivating the gas valve, and for receiving temperature measurements from the temperature measuring component.

The method and apparatus of this invention performs the entire cooking process automatically. The operator selects a recipe from a displayed menu, mounts a corresponding food tray, and presses a "start" key. When the cooking is complete, the operator scoops the food onto a serving dish, replaces the wok and spatula with clean utensils, and is ready to repeat the process for the next order. The computer control system under program instructions heats the wok, adds and stirs the food, times the cooking, measures and adds liquid ingredients and regulates the heat, all according to the recipe selected. The computer control system accommodates a multiplicity of recipes each of which may be individually varied by the person preparing the recipes. New recipes may be added to the computer control system using a straightforward cookbook notation. Furthermore, by operating several of these inventions, a single operator may cook several orders concurrently.

BRIEF DESCRIPTION OF THE DRAWINGS

For an illustration of the construction and operation of the preferred embodiment, reference is made to the attached several views wherein identical reference numbers are utilized to refer to identical or equivalent components throughout the several views.

FI. 4 is a side elevation view of the plurality of liquid dispensers for holding and dispensing liquid ingredients into the wok.

Figure 5:
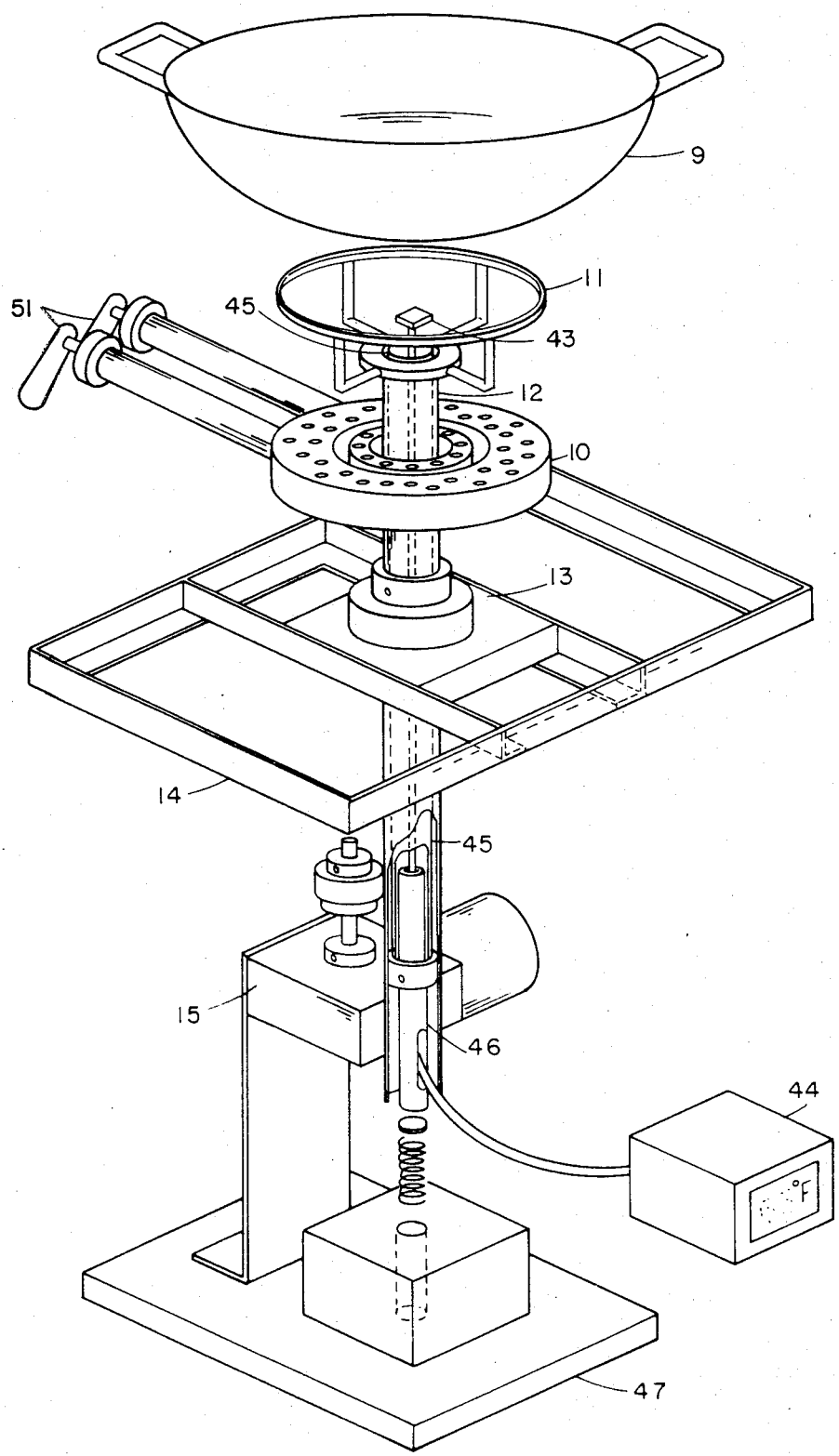

FIG. 5 is a side elevation view of the wok with means for rotation about a vertical axis, and the temperature measuring component for measuring the temperature of the wok.

FIG. 6 is a "filled-out" recipe worksheet used for preparing a recipe to be entered into the computer control system.

Figure 7:
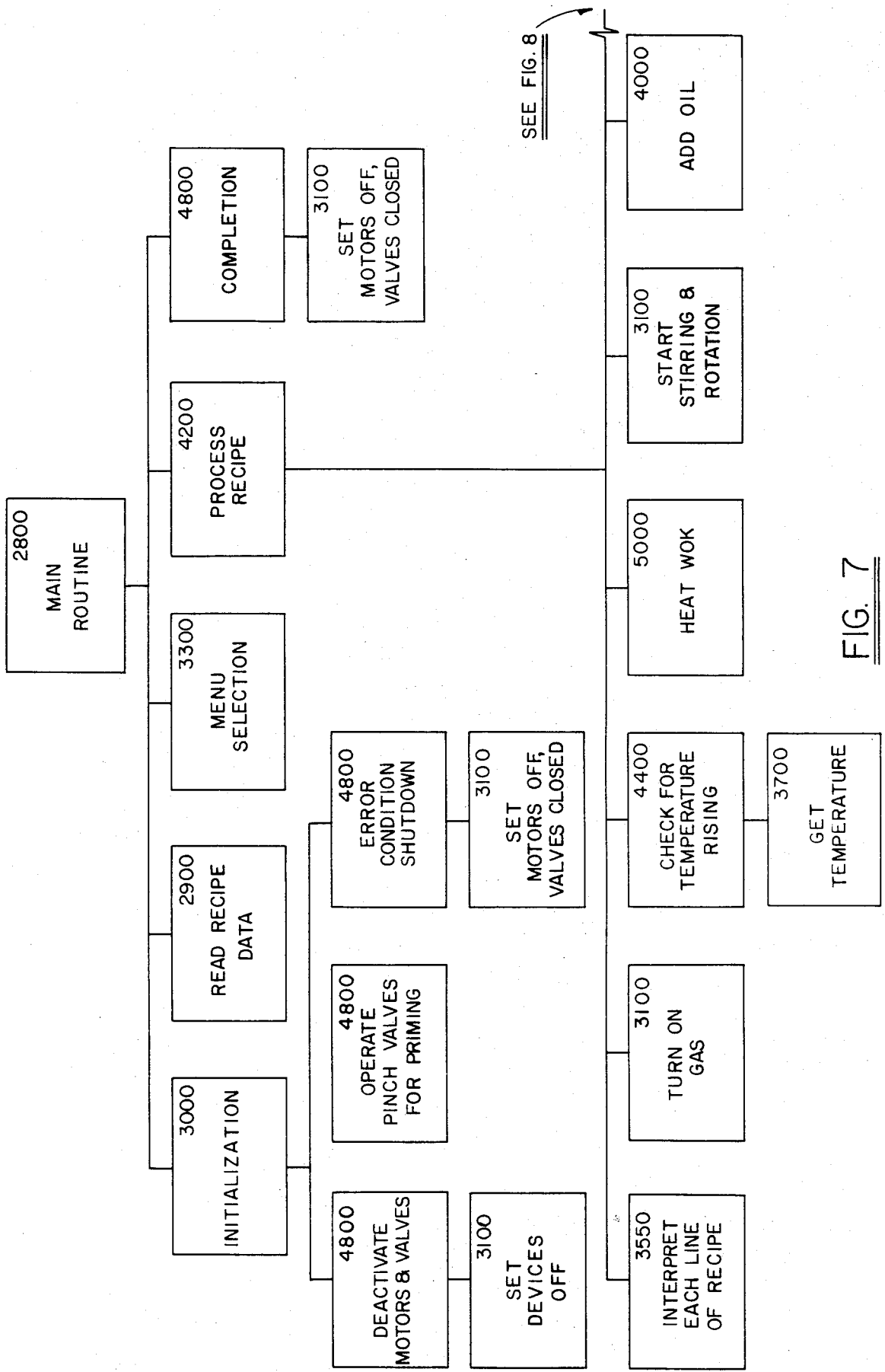
Figure 8:
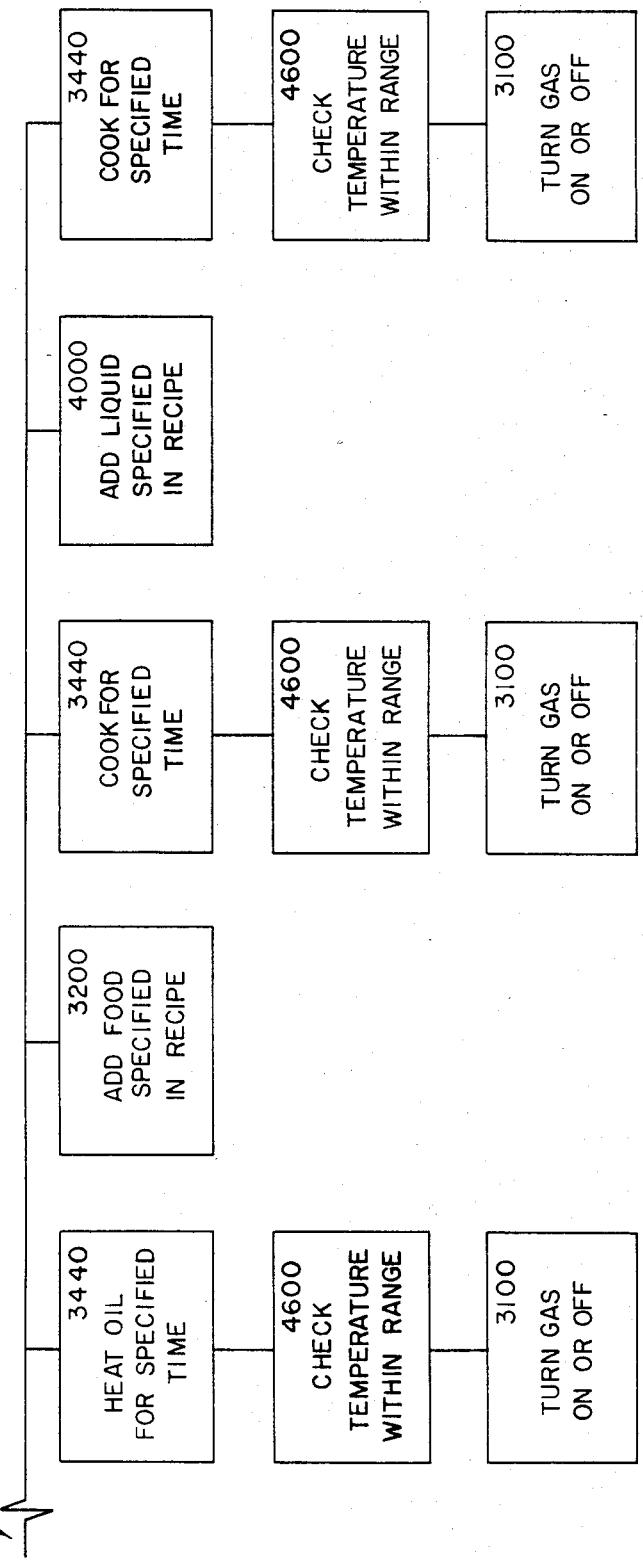

FIG. 7 and FIG. 8 are program structure flowcharts illustrating the program logic of the computer control system.

Figure 9:
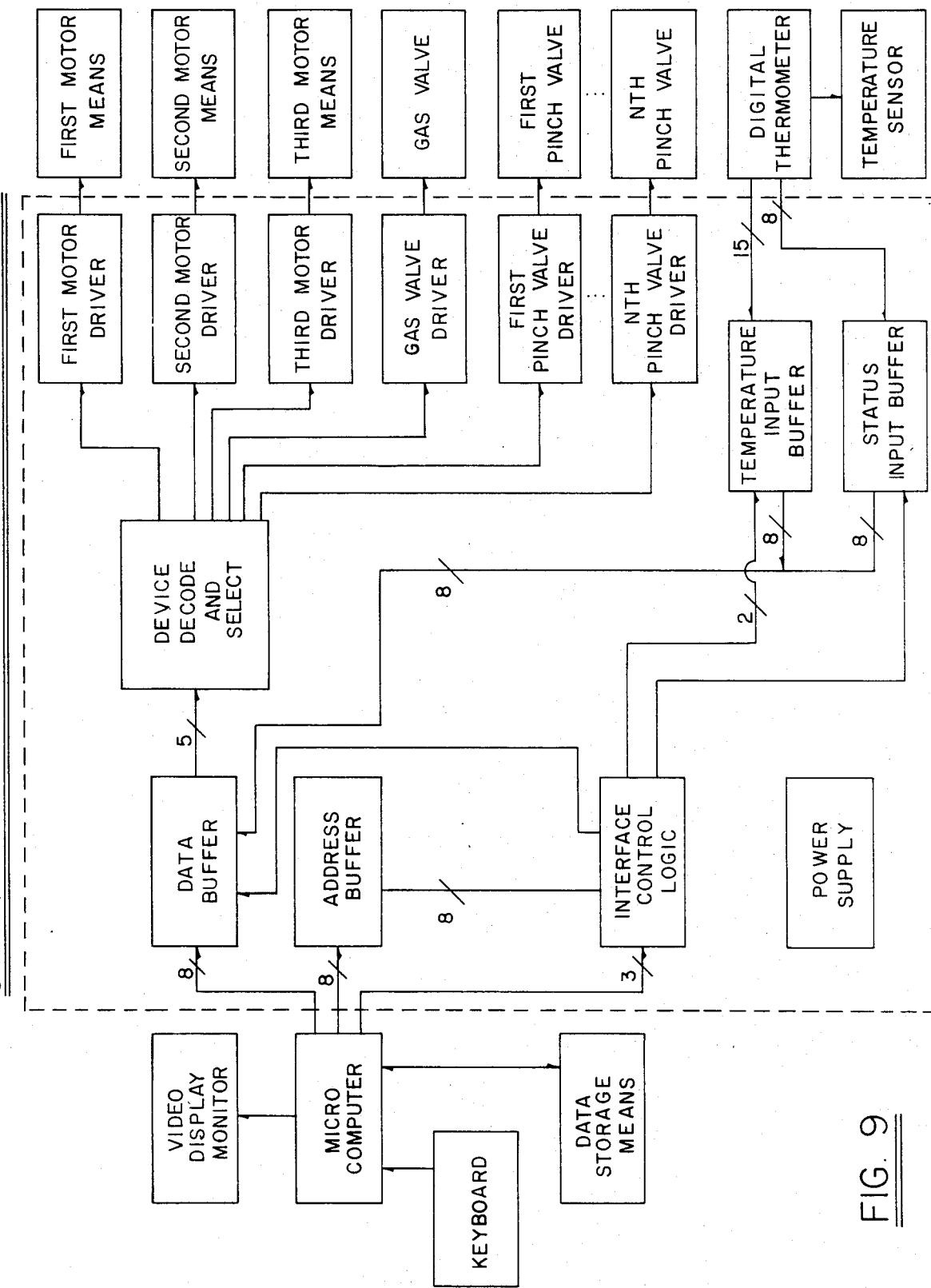

FIG. 9 is a schematic diagram of the computer control system interface.

DESCRIPTION OF THE PREFERRED EMBODIMENT

For a description of the construction and utilization of this method and apparatus, reference is made to the attached drawings. This applicant has constructed, tested and extensively experimented with a fully operational prototype of this invention in his kitchen at home.

Figure 1:
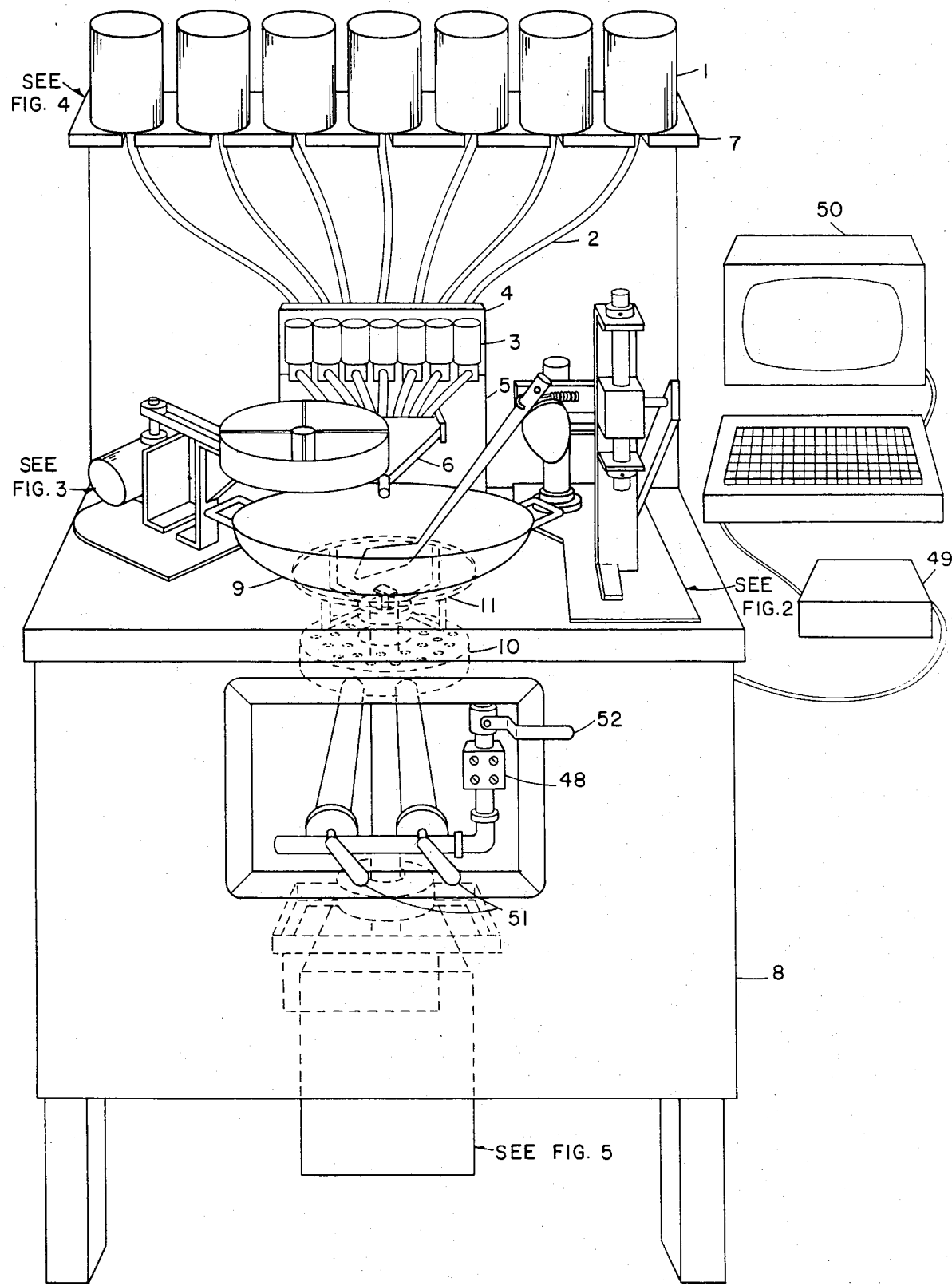
FIG. 1 is a front elevation view of the overall assembly.

The construction of the apparatus begins with a conventional Chinese stove 8 of FIG. 1 as used in Chinese restaurants and a wok 9 of FIGS. 1 and 5. In conventional usage of the Chinese stove, the wok is stationary over a gas burner 10. A Chinese chef controls the heat by a manual gas valve 52. The air and gas mixture to the gas burner is adjustable by two air/gas mixture valves 51. In the apparatus of this invention the wok rests on a metal collar 11 rotatably supported over the gas burner. The collar is operably attached to the top of a vertical pipe 12. The vertical pipe passes downward through the center of the gas buner 10, and is rotatably supported beneath the gas burner by a ball bearing pillow block 13. The ball bearing pillow block is operably mounted to the framework 14 of the Chinese stove. A first motor means 15, operably coupled to the vertical pipe, rotates the vertical pipe thereby rotating the collar and the wok. The first motor means is activated and deactivated by signals from a computer control system to be subsequently described.

Figure 3:
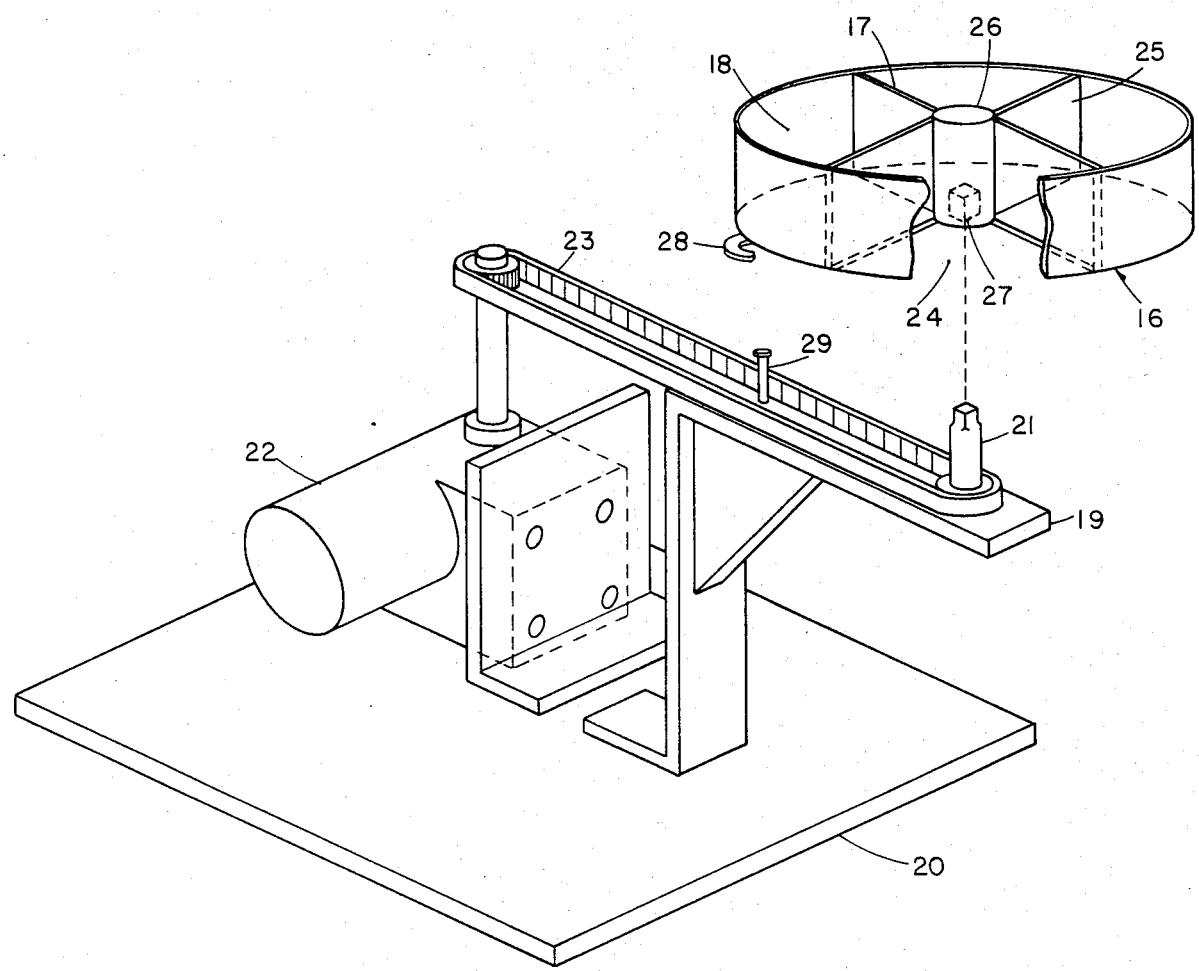
FIG. 3 is a side elevation view of the food tray with rotatable divider for holding and dispensing food ingredients into the wok.

A food dispensing component illustrated in FIG. 3, is comprised of a food tray 16, a rotatable divider 17 which fits in the food tray and which partitions the food tray into a plurality of compartments 18, a tray arm 19 which projects horizontally over the wok, a first base 20 which supports the tray arm, a tray spindle 21 rotatably mounted vertically on the tray arm over the wok, a second motor means 22 operably mounted on the first base, a first driving means 23 which operably couples the second motor means to the tray spindle. The food tray is comprised of a round pan with bottom means having a hole in the center thereof and a sector-shaped opening thereof 24. The rotatable divider is comprised of a plurality of panels 25 which radiate outward from a hub 26. A keyed mounting ring 27 is operably attached to the bottom of the hub. The tray spindle has a keyed tip matching the keyed mounting ring. The food tray containing the rotatable divider is removably mounted upright on the tray spindle by the operator with the tray spindle fitting through the hole in the bottom means of the food tray and into the keyed mounting ring on the bottom of the hub of the rotatable divider. The second motor means is activated by signals from the computer control system.

When activated, the second motor means rotates the first driving means to rotate the tray spindle thereby turning the rotatable divider. This rotation moves the food ingredients, in the compartment adjacent to the sector-shaped opening in the food tray, over the sector-shaped opening where, by gravity, the food ingredients fall into the wok. The amount of rotation is a predetermined quantity programmed in the computer control system. At the end of the predetermined rotation the computer control system deactivates the second motor means. This allows the food ingredients in each compartment to be dispensed into the wok in a predetermined sequence and in predetermined intervals by signals from the computer control system. A further detail of the food tray is a catch means 28 operably attached to the food tray which engages a stop means 29 operably attached to the tray arm when the food tray with rotatable divider is mounted on the tray spindle. This prevents the food tray from turning when the rotatable divider turns.

Figure 2:
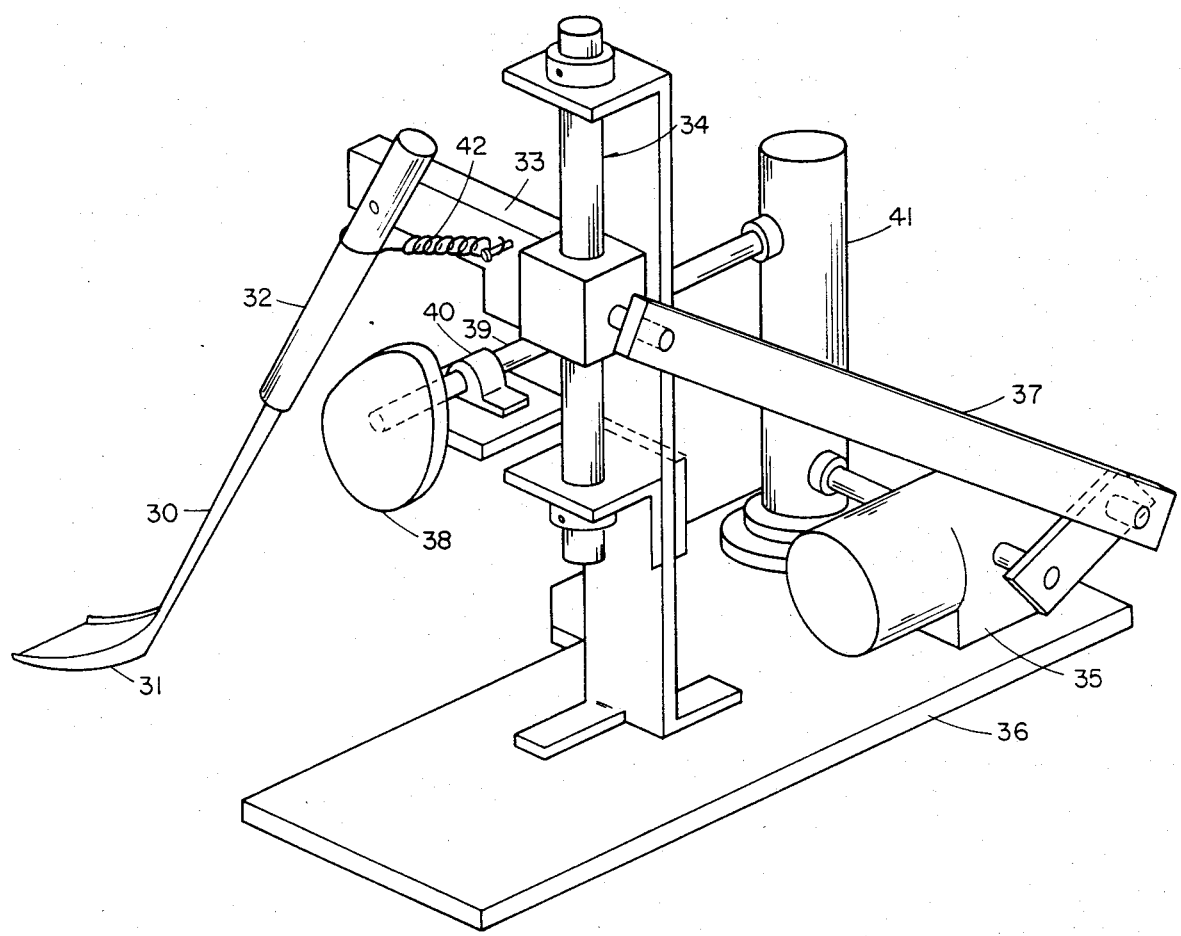
FIG. 2 is a side elevation view of the spatula with driving means for stirring and tossing the food as it cooks.

The components for stirring the food and liquid ingredients, illustrated in FIG. 2, is comprised of a spatula 30 with a blade 31 and a handle 32, a spatula arm 33, a vertical reciprocating linear motion means 34, a third motor means 35, a second base 36 on which the third motor means is mounted, a second driving means 37 for coupling the third motor means to the vertical reciprocating linear motion means, a cam 38, a rotatable cam rod 39, a cam rod support means 40, a third driving means 41 for coupling the cam to the third motor means. The spatula is removably connected pivotally at the handle to the spatula arm. The spatula arm is operably attached to the vertical reciprocating linear motion means. The vertical reciprocating linear motion means is operably coupled to the second driving means. The second driving means is operably coupled to the third motor means. This coupling converts the rotary motion of the third motor means to a vertical reciprocating linear motion of the spatula arm. On the downward motion of the spatula arm the blade of the spatula sweeps down the inside surface of the wok until reaching just past bottom center of the wok. The blade of the spatula is biased against the inside surface of the wok by a spring means 42 operably attached removably to the handle of the spatula and operably attached to the other end to the spatula arm. When the blade of the spatula reaches just past bottom center of the wok the movement of the spatula arm reverses direction and draws the blade of the spatula back to its initial position at the inside edge of the wok.

As the blade of the spatula is drawn back, the cam, positioned directly beneath the spatula handle, rotates to make contact with the spatula handle. On contact, the cam lifts the spatula up from the inside surface of the wok as the spatula is drawn back. With the wok rotating, the motion of the spatula blade stirs and tosses the food and liquid ingredients from all sides of the wok. Further details of the cam are as follows. The cam is operably mounted perpendicularly to the end of the cam rod. The cam rod is rotatably mounted operably to the cam rod support means. The cam rod is operably attached to the third driving means. The third driving means is operably coupled to the third motor means. The third driving means transmits a counterclockwise rotary motion of the third motor means to clockwise rotary motion of the cam. The motion of the cam is synchronized with the motion of the spatula arm since both the cam and the spatula arm are driven by the same third motor means. The third motor means is activated and deactivated by signals from the computer control system.

Figure 4:
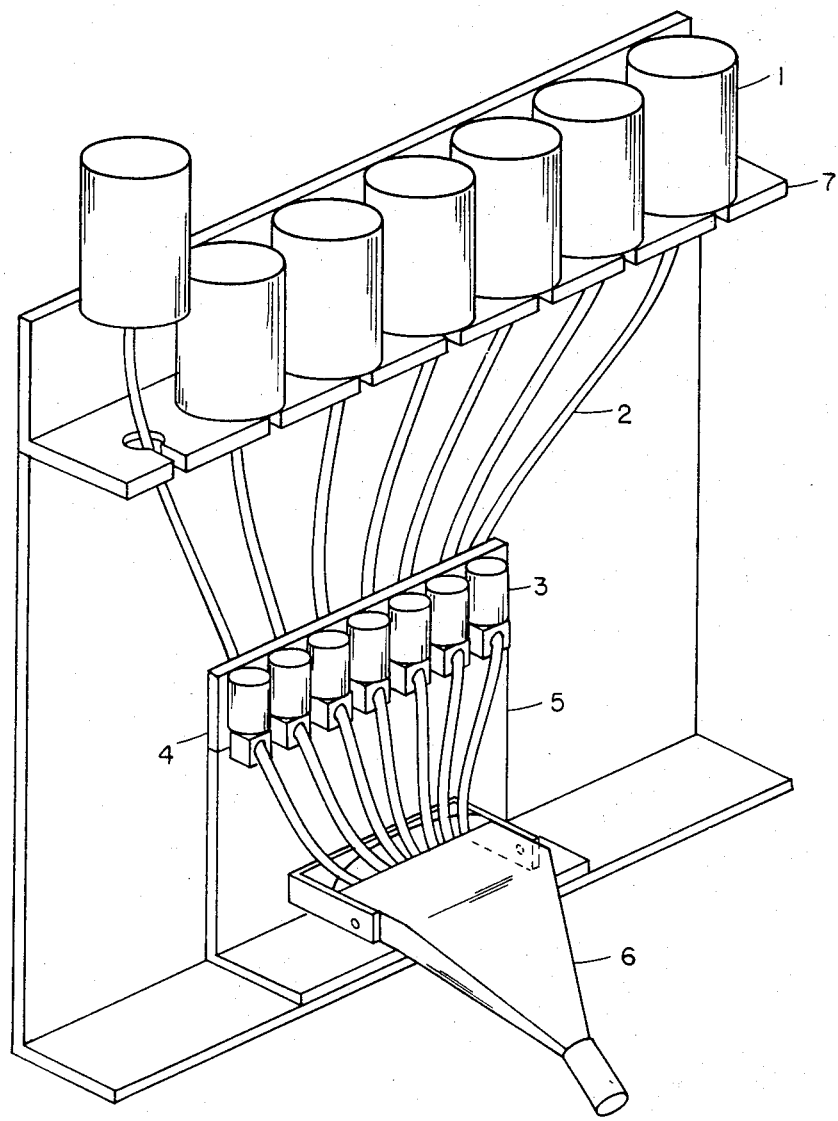

The liquid dispensing component illustrated in FIG. 4, is comprised of a plurality of identical liquid dispensers each comprised of a bulk container 1 to hold the liquid, a length of hose 2 operably attached to an outlet means on each bulk container, a pinch valve 3 installed on each length of hose so that the flow of liquid is controlled by the pinch valve; a horizontal rack to support the pinch valves 4, a funnel means 6, a third base 5 to support the horizontal rack and the funnel means, and a fourth base 7 to support the bulk containers. The individual pinch valves are electrically activated (to open) and deactivated (to close) by signals from the computer control system. The pinch valves are operably mounted on the horizontal rack which is operably mounted on the third base. The discharging ends of the hoses converge into the funnel means. The funnel means is mounted on the third base with the spout of the funnel means pointing into the wok. The bulk containers, holding liquid ingredients such as soy sauce, chicken broth, cooking oil and the like, are mounted on the fourth base which is operably attached to the back of the Chinese stove.

When a pinch valve is activated, gravity feed produces a flow of the respective liquid which passes downward through the respective hose through the funnel means and into the wok. The length of time a pinch valve is opened is calculated by the computer control system to dispense a desired quantity of the respective liquid. Through extensive experimentation mathematical equations for flow rates for each liquid have been derived and programmed into the computer control system. These equations allow a recipe specification of one teaspoon of soy sauce, for example, to be converted to a time interval for which the respective pinch valve is to remain open in order to dispense one teaspoon of soy sauce. These equations are shown in lines 4070–4130 of the computer program listing which is subsequently presented. Although gravity feed is employed in this applicant's prototype, it is apparent that pressurization of the liquid containers could be used to increase the flow rates. It is also apparent that food-grade micropumps and corresponding control means could be substituted for the pinch valves to meter precise quantities of the various liquids.

The temperature measuring component, illustrated in FIG. 5, is comprised of a temperature sensor 43 for sensing the temperature of the wok, a digital thermometer 44 with BCD output for converting electrical signals from the temperature sensor to temperature measurements for input to the computer control system, a thermocouple protection tube 45, a sensor support means 46 for supporting the temperature sensor and thermocouple protection tube, and a fifth base 47 for supporting the sensor support means. The thermocouple protection tube is positioned inside the vertical pipe 12. The temperature sensor fits inside the thermocouple protection tube thereby insulating the temperature sensor from the vertical pipe in the region around the intense heat of the gas burner. The temperature sensor and the thermocouple protection tube are operably attached to the sensor support means. The tip of the temperature sensor extends upward through the thermocouple protection tube to touch the bottom surface of the wok. Electrical leads of the temperature sensor extend downward through the thermocouple protection tube and into the sensor support means. The electrical leads emerge from the sensor support means and travel beneath the Chinese stove to the digital thermometer located near the computer control system. The sensor support means fits into a hole in the fifth base. A spring means 42 in the hole of the fifth base biases the sensor support means upwardly thereby biasing the tip of the temperature sensor against the bottom of the wok.

The gas valve component is comprised of a gas valve 48 of FIG. 1, electrically operated, operably installed in the gas burner supply line of the Chinese stove downstream of the supply branch to the pilot light. The gas valve is activated (to open) and deactivated (to close) by signals from the computer control system. In the deactivated position only the pilot light is on. In the activated position a full flow of gas is supplied to the gas burner from the supply source. As a matter of safety, when the computer control system activates the gas valve the computer control system checks for an immediate increase in temperature of the wok. If this temperature increase does not occur within a few seconds the computer control system deactivates the gas valve and displays a message to the operator to check the pilot light.

The computer control system component is comprised of a general purpose digital microcomputer system 50 with a minimum of 16000 bytes of memory, a programming language BASIC, a video display monitor, a data storage means, a data entry keyboard, an electronic interface 49 which by computer generated signals activates and deactivates the means to rotate the wok, the means to drive the spatula, the means to rotate the rotatable divider of the food tray, activates and deactivates the plurality of liquid dispensers, activates and deactivates the gas valve, and receives the temperature measurements from the digital thermometer. A schematic diagram of the electronic interface is shown in FIG. 9. The numbers with slashes on the lines connecting the components in the diagram indicate the number of wires connecting those components. When no number is given one wire may be assumed.

Activation and deactivation of the respective first, second and third motor means, the gas valve and the plurality of pinch valves is achieved by a program instruction in BASIC: "OUT, port, value". This instruction outputs a byte value to a specified computer port and generates a write command. The byte value contains an address of the device to be selected and a bit pattern which indicates whether the device is to be activated or deactivated. When the computer control system interface receives a write command and a valid address from the computer, it decodes the address and routes the 5 low-order bits on the computer data bus to the device decode and select logic. The device decode and select logic decodes the 5 low-order bits and activates or deactivates the selected device. Temperature measurements of the wok are input to the computer control system by a program instruction in BASIC: "INP, port". This instruction inputs a byte value from the specified computer port and generates a read command. Four of these instructions are utilized under program instructions to input a temperature measurement. The first and second INP instructions input a status indicator from the digital thermometer. When the status indicator shows that the temperature measurement is latched on the computer data bus, the third and fourth INP instructions input the low and high order bits of the 15 bit temperature measurement. When the computer control system interface receives a read command and a valid address from the computer, it decodes the address and then reads the temperature status or the temperature measurement respectively from the digital thermometer.

The computer control system is further comprised of program instructions to store and process recipe data, to display a menu to the operator, to accept a selection from the menu, and to activate and deactivate the above components to cook the menu selection. The computer control system interface is constructed using conventional techniques for digital circuit logic and commercially available components. A program structure flowchart is shown in FIGS. 7 and 8. The number in the upper right corner of each box refers to the beginning line number in the computer program for the respective subroutine. Following is the source listing of the entire computer program according to this invention.

```
1    DATA 12
2    'ENTER THE TOTAL NUMBER OF RECIPES ON THE ABOVE LINE
5    ' ********
10   DATA CHICKEN WITH VEGETABLES
15   DATA 350
20   DATA OIL    3 TBS   20
25   DATA FOOD           30
30   DATA FOOD           15
35   DATA FOOD           15
40   DATA TEMP   325
45   DATA BROTH  4 TBS   30
50   DATA SOY    1 TBS   0
55   DATA SHERRY 1 TBS   0
60   DATA STARCH 1 TBS   0
65   DATA SESAME 2 TSP   0
70   DATA OYSTER 2 TBS   30
75   DATA END
78   ' ********
80   DATA GREEN ONION BEEF
85   DATA 350
90   DATA OIL    3 TBS   20
95   DATA FOOD           45
100  DATA FOOD           30
105  DATA SHERRY 1 TSP   0
110  DATA SOY    1 TSP   30
115  DATA END
120  ' ********
125  DATA PORK WITH VEGETABLES
130  DATA 350
135  DATA OIL    3 TBS   20
140  DATA FOOD           60
145  DATA FOOD           0
150  DATA SHERRY 1 TBS   60
155  DATA BROTH  4 TBS   15
160  DATA STARCH 1 TBS   10
165  DATA FOOD           0
170  DATA SOY    1 TBS   60
175  DATA END
180  ' ********
185  DATA PORK IN HOT BEAN SAUCE
190  DATA 350
195  DATA OIL    3 TBS   20
200  DATA FOOD           30
205  DATA TEMP   325     80
210  DATA FOOD           10
215  DATA SHERRY 1 TBS   0
220  DATA SOY    2 TSP   0
225  DATA SESAME 2 TSP   0
230  DATA TEMP   350     30
235  DATA END
240  ' ********
245  DATA KING'S CHICKEN
250  DATA 350
255  DATA OIL    2 TBS   20
260  DATA FOOD           40
265  DATA FOOD           60
270  DATA BROTH  4 TBS   60
275  DATA END
```

```
280 ' ********
285 DATA MO-SHU PORK
290 DATA 350
295 DATA OIL    3 TBS   20
300 DATA FOOD       30
305 DATA FOOD       60
310 DATA BROTH  5 TBS   90
315 DATA SHERRY 2 TSP    0
320 DATA SOY    2 TSP   30
325 DATA FOOD       30
330 DATA SESAME 1 TSP   10
335 DATA END
340 ' ********
345 DATA DUCK WITH GINGER AND PEPPERS
350 DATA 350
355 DATA OIL    4 TBS   20
360 DATA FOOD   60
365 DATA SHERRY  2 TBS   0
370 DATA SOY    2 TBS   20
375 DATA BROTH 16 TBS   60
380 DATA END
385 ' ********
390 DATA CHICKEN WITH ORANGE PEEL
395 DATA 350
400 DATA OIL    2 TBS   20
405 DATA FOOD        0
410 DATA SESAME  2 TSP  60
415 DATA TEMP 325      0
420 DATA FOOD        0
425 DATA SHERRY  1 TSP  0
430 DATA SOY    1 TBS  60
435 DATA TEMP 350     20
440 DATA END
445 ' ********
450 DATA KUNG PAO CHICKEN
455 DATA 350
460 DATA OIL    3 TBS   20
465 DATA FOOD       30
470 DATA FOOD       40
475 DATA SESAME  1 TSP 20
480 DATA END
485 ' ********
490 DATA HARVEST PORK
495 DATA 350
500 DATA OIL    3 TBS   20
505 DATA FOOD       30
510 DATA FOOD       60
515 DATA BROTH  8 TBS    0
520 DATA SOY    2 TBS    0
525 DATA STARCH 1.5 TBS 20
530 DATA END
535 ' ********
540 DATA BEEF WITH CARROTS AND BOK CHOY
545 DATA 350
550 DATA OIL    3 TBS 20
555 DATA FOOD       30
560 DATA FOOD       60
565 DATA FOOD        0
570 DATA SHERRY 1 TBS 30
575 DATA SESAME 2 TSP 20
580 DATA END
585 ' ********
590 DATA PORK WITH PEKING SAUCE
595 DATA 350
600 DATA OIL    4 TBS   20
605 DATA FOOD       60
```

```
610 DATA SHERRY  2 TSP  0
615 DATA SOY     2 TSP  30
620 DATA END
625 ' ********
2800 ' MAIN SUBROUTINE
2810 CLEAR 300
2820 GOSUB 3000    'INITIALIZATION
2830 GOSUB 2900    'READ RECIPE DATA
2840 GOSUB 3300    'DISPLAY MENU & ACCEPT SELECTION
2850 GOSUB 4200    'PROCESS SELECTED RECIPE
2855 MF=0
2860 GOSUB 4800    'COMPLETION - TURN OFF MOTORS & GAS
2870 GOTO 2840
2880 END
2900 ' SUBROUTINE TO READ RECIPE DATA
2905 READ NR    'TOTAL # OF RECIPES
2910 DIM RM$(NR,12), RT$(NR), TT$(NR)   'SET UP TABLES
2920 FOR I = 1 TO NR   'FOR EACH RECIPE
2930 READ RT$(I)   'RECIPE NAME
2940 READ TT$(I)   'INITIAL TEMPERATURE
2950 J = 1         'SEQ #
2960 READ RM$(I,J)   'INGREDIENT LINE
2970 IF LEFT$(RM$(I,J),3) <> "END" THEN J=J+1: GOTO 2960
2980 NEXT I   'END OF THIS RECIPE
2990 RETURN
3000 ' SUBROUTINE TO INITIALIZE SYSTEM
3005 TI% = 0   'DEFINED TO BE FIRST IN VARIABLE TABLE SINCE
3010 TC% = 0   'TIMING IS CRITICAL. USED IN TIMING LOOP.
3020 M% = 0    'PORT VALUE
3024 N% = 0    'PORT VALUE
3028 P% = 128  'PORT INDEX
3034 MF = 1: GOSUB 4800   'INITIALIZE MOTORS & VALVES
3036 FG = 0
3038 DIM F1$(4)   'TABLE OF 4 VALUES FROM INGREDIENT LINE
3040 PRINT "TYPE Y TO PRIME LIQUID DISPENSERS"
3042 PRINT "TYPE N TO SKIP THIS STEP"
3044 E$ = INKEY$
3046 IF E$ = "" THEN GOTO 3044
3048 IF E$ = "N" THEN GOTO 3070
3050 A2 = 3: A3$ = "TBS"
3051 P$ = "OIL":    AMT=A2: U$=A3$: GOSUB 4000   'CYCLE THROUGH
3052 P$ = "SOY":    AMT=A2: U$=A3$: GOSUB 4000   'PINCH VALVES
3054 P$ = "BROTH":  AMT=A2: U$=A3$: GOSUB 4000   'TO PRIME
3056 P$ = "SHERRY": AMT=A2: U$=A3$: GOSUB 4000
3058 P$ = "STARCH": AMT=A2: U$=A3$: GOSUB 4000
3060 P$ = "SESAME": AMT=A2: U$=A3$: GOSUB 4000
3062 P$ = "OYSTER": AMT=A2: U$=A3$: GOSUB 4000
3070 PRINT "ENTER ROOM TEMPERATURE OF COOKING OIL"
3075 INPUT OT
3080 IF OT < 50 OR OT > 120 THEN PRINT "OUT OF RANGE, REENTER": GOTO 3075
3090 CLS
3092 PRINT "GETTING RECIPE DATA; ONE MOMENT PLEASE"
3095 RETURN
3097 MF = 2: GOSUB 4800: STOP   'SHUTDOWN
3100 ' SUBROUTINE TO TURN ON OR OFF THE GAS VALVE AND STIR/ROT
ATE MOTORS. PRIOR TO CALLING, SET M$ = "STIR-ON", "STIR-OFF", "
ROTATE-ON", "ROTATE-OFF",       "GAS-ON" OR "GAS-OFF".
3105   IF FG=1 THEN PRINT "BEGIN "; M$
3110   I=0
3120   IF M$ = "GAS-ON"  THEN I = 16: GAS$ = "ON"
3125   IF M$ = "GAS-OFF" THEN I = 0:  GAS$ = "OFF"
3130   IF M$ = "STIR-ON"  THEN I = 22
3135   IF M$ = "STIR-OFF" THEN I = 6
3140   IF M$ = "ROTATE-ON"  THEN I = 21
3145   IF M$ = "ROTATE-OFF" THEN I = 5
3150   OUT P%,I
```

```
3160  IF FG>1 THEN PRINT "END "; M$
3170  M$ = ""
3180  RETURN
3199  '
3200  ' SUBROUTINE FOR TURNING FOOD TRAY. NO PARAMETERS REQ'D.
3205  IF FG=1 THEN PRINT "TURN FOOD TRAY"
3210  TC% = 2000 ' LOOP COUNTER
3215  M% = 23: N% = 7
3220  OUT P%,M%
3230  FOR TI% = 1 TO TC%: NEXT TI%
3240  OUT P%,N%
3250  OUT P%,N%
3260  IF FG>1 THEN PRINT "END TURN FOOD TRAY"
3270  RETURN
3299  '
3300  ' SUBROUTINE TO DISPLAY MENU AND ACCEPT SELECTION
3303  CLS
3306  PRINT "ENTER RECIPE # OR  M  FOR MENU,  PRESS ENTER"
3309  INPUT R$
3312  IF R$ = "M" THEN GOTO 3320
3315  IF VAL(R$) > 0 AND VAL(R$) <= NR THEN R = VAL(R$):  GOTO 3375

3318  GOTO 3303
3320  NN = 1  'RECIPE # POINTER
3321  LC = 1  'LINE CT
3324  PRINT NN; TAB(3); RT$(NN)
3327  IF LC=10 OR NN=NR THEN GOTO 3348   'FULL SCREEN OR END
3330  NN=NN+1: LC=LC+1
3333  GOTO 3324
3348  PRINT
3351  PRINT "ENTER RECIPE #  OR   TYPE  C  TO CONTINUE MENU,"
3354  PRINT "OR TYPE   B  TO DISPLAY MENU FROM BEGINNING."
3357  INPUT R$
3360  IF R$ = "B" THEN CLS: GOTO 3320
3363  IF VAL(R$) > 0  AND VAL(R$) <= NR THEN R = VAL(R$):    GOTO 3375

3366  IF R$ = "C" AND NN = NR THEN PRINT "NO MORE RECIPES": GOTO 3351

3369  IF R$ = "C" THEN CLS: NN = NN+1: GOTO 3321
3375  CLS
3380  PRINT "RECIPE "; R; " "; RT$(R)
3381  PRINT
3382  PRINT "TYPE   Y   TO CONFIRM SELECTION,   OR"
3383  PRINT "TYPE   N   TO REENTER RECIPE #"
3385  X$ = INKEY$
3387  IF X$ = "" THEN GOTO 3385
3388  IF X$ = "N" THEN GOTO 3303
3390  CLS
3392  PRINT "RECIPE "; R; " "; RT$(R)
3394  PRINT "WOK HEATING"
3396  RETURN
3440  ' SUBROUTINE TO TIME COOKING.  SET TIME = # OF SECONDS.
3445  IF TIME = 0 THEN RETURN
3450  T1=1
3455  TIME = INT((TIME/1.5) + .5)
3460   GOSUB 4600   'CHECK TEMP WITHIN RANGE
3465  IF T1 < TIME THEN T1=T1+1: GOTO 3460
3470  RETURN
3550  ' SUBROUTINE TO PARSE INGREDIENT LINES.         VALUES ARE PUT IN F1$(I).
3555  FOR I = 1 TO 4   'CLEAR
3560   F1$(I) = "": NEXT I
3570  P = 1   'PTR TO 1ST NONBLANK CHAR IN LINE
3580  FOR I = 1 TO 4
3590  IF MID$(SB$,P,1) <> " " THEN GOTO 3610
3600  IF P = LEN(SB$) THEN RETURN ELSE P=P+1: GOTO 3590
```

```
3610 N = P + 1   'PTR TO 1ST BLANK CHAR
3620 IF MID$(SB$,N,1) = " " OR N >= LEN(SB$) THEN GOTO 3640
3630 N = N+1: GOTO 3620
3640 IF N = LEN(SB$) THEN F1$(I) = MID$(SB$,P,N-P+1) ELSE   F1$(I) = MID$(SB$,P,N-P)
3650 IF N >= 17 THEN RETURN ELSE P=N+1
3660 NEXT I
3670 RETURN
3699 '
3700 ' SUBROUTINE TO READ TEMPERATURE INPUT IN BCD AND STORE IN CTEMP
3705  IF FG=1 THEN PRINT "READ TEMPERATURE"
3710  F=0: L=0: H=0: M=0: CTEMP=0
3730  F = INP(130)   'INPUT FROM PORT 130
3740  IF (F AND 1) =0 THEN GOTO 3730   ' WAIT TIL SIGNAL IS 1
3750  F = INP(130)
3760  IF (F AND 1) = 1 THEN GOTO 3750 ' THEN AS SOON AS SIGNAL
                                        GOES 0 (LOW), READ
3770  L = INP(128)
3780  H = INP(129)
3790  M = ((H AND 16)/16) * 1000
3800  M = M + (H AND 15) * 100
3810  M = M + ((L AND 240)/16) * 10
3820  CTEMP = M + (L AND 15)
3830  IF FG>1 THEN PRINT "END READ TEMP"
3840  RETURN
3999 '
4000 'SUBR TO OPERATE PINCH VALVES FOR SPECIFIED INGREDIENT AND AMOUNT
. PRIOR TO CALLING SET P$, AMT AND U$   E.G.  P$ = "OIL": AMT = 2:  U$ = "TBS":  GOSUB 4000
4020  IF AMT=0 OR AMT > 16 THEN PRINT "ERROR IN PV AMT, AMT = "; AMT: GOTO 3097
4040  IF U$ = "TSP" THEN X = AMT : GOTO 4070
4050  IF U$ = "TBS" THEN X = AMT * 3 : GOTO 4070
4065  PRINT "ERROR IN PV UNITS, U$ = "; U$: GOTO 3097
4070  IF P$ = "OIL" THEN Y = INT(550*X*(1.867-.01333*OT)):  I = 27 :
 GOTO 4140
4080 IF P$ = "SOY" THEN Y = INT(78*X+40): I=28: GOTO 4140
4090  IF P$ = "BROTH" THEN Y = INT(62*X+60): I=24: GOTO 4140
4100  IF P$ = "SHERRY" THEN Y = INT(65*X+30): I=26: GOTO 4140
4110  IF P$ = "STARCH" THEN Y = INT(205*X): I=29: GOTO 4140
4120  IF P$ = "SESAME" THEN Y = INT(440*X+30): I=25: GOTO 4140
4130  IF P$ = "OYSTER" THEN Y = INT(270*X): I=30: GOTO 4140
4135  PRINT "ERROR IN PV INGREDIENT, P$ = "; P$: GOTO 3097
4140 M% = I: N% = I-16
4150 TC% = Y
4155 OUT P%,M%
4160 FOR TI% = 1 TO TC%: NEXT TI%
4165 OUT P%,N%
4170 P$ = "": AMT = 0: U$ = ""
4180  RETURN
4200 ' SUBROUTINE TO PROCESS RECIPE SELECTED.   INTERPRETS EACH INGREDIENT LINE AND PERFORMS OPERATIONS.
4205 SL = 1   'SEQUENCE LINE #
4210 SB$ = RM$(R,SL)   'PUT SEQ LINE IN BUFFER
4215 GOSUB 3550   'PARSE
4220 IF F1$(1) = "OIL" THEN GOTO 4225 ELSE GOTO 4270
4225   TEMP = VAL(TT$(R))   'INITIAL TEMP
4228   M$ = "GAS-ON": GOSUB 3100   'TURN ON GAS
4230   GOSUB 4400   'CHECK FOR RISING TEMP
4235   IF T$ <> "RISING" THEN PRINT "CHECK PILOT LIGHT":GOTO3097
4240   GOSUB 5000   'HEAT WOK TO TEMP
4245   M$ = "ROTATE-ON": GOSUB 3100   ' START ROTATION OF WOK
4250   M$ = "STIR-ON":   GOSUB 3100   ' START STIRRING
4255   P$ = "OIL": AMT = VAL(F1$(2)): U$ = F1$(3): GOSUB 4000
4260   TIME = VAL(F1$(4)): GOSUB 3440   'HEAT OIL
```

```
4265 SL = SL+1: SB$ = "": GOTO 4210  'GET NEXT SEQ LINE
4270 IF F1$(1) = "FOOD" THEN GOTO 4275 ELSE GOTO 4290
4275   GOSUB 3200  'TURN FOOD TRAY
4280   TIME = VAL(F1$(2)): GOSUB 3440  'COOK
4285   SL = SL+1: SB$ = "": GOTO 4210  'GET NEXT SEQ LINE
4290 IF F1$(1) = "TEMP" THEN GOTO 4295 ELSE GOTO 4310
4295   TEMP = VAL(F1$(2))
4300   TIME = VAL(F1$(3)): GOSUB 3440  'COOK
4305   SL = SL+1: SB$ = "": GOTO 4210  'GET NEXT SEQ LINE
4310 IF F1$(1) = "END" THEN RETURN  'END OF RECIPE
4320 IF F1$(1) = "BROTH" THEN GOTO 4360
4322 IF F1$(1) = "SOY"    THEN GOTO 4360
4324 IF F1$(1) = "SHERRY" THEN GOTO 4360
4326 IF F1$(1) = "STARCH" THEN GOTO 4360
4328 IF F1$(1) = "SESAME" THEN GOTO 4360
4330 IF F1$(1) = "OYSTER" THEN GOTO 4360
4340 PRINT "ERROR IN INGREDIENT, INGRED = "; F1$(1): GOTO 3097
4360 P$=F1$(1): AMT=VAL(F1$(2)): U$=F1$(3)
4362 GOSUB 4000
4365 TIME = VAL(F1$(4)): GOSUB 3440  'COOK
4370 SL = SL+1: SB$ = "": GOTO 4210
4399 '
4400 ' SUBROUTINE TO CHECK FOR CHANGING TEMPERATURE. ROUTINE SETS T$
     = "RISING" OR "FALLING" DEPENDING ON CHANGE   IN A 4 SECOND PERIOD.
4410   IF FG=1 THEN PRINT "CHECK RISING/FALLING TEMP"
4430   Q1=0: Q2=0
4440   GOSUB 3700   ' GET TEMP
4450   Q1 = CTEMP
4460   FOR I = 1 TO 3000
4470   NEXT I
4480   GOSUB 3700   ' GET TEMP
4490   Q2 = CTEMP
4500   IF Q2 > Q1 + 1 THEN T$ = "RISING" ELSE T$ = ""
4520 IF FG > 1 THEN PRINT "END RISING CHECK. TEMP "; T$
4530   RETURN
4599 '
4600 ' SUBROUTINE TO CHECK TEMP WITHIN SPECIFIED RANGE.  PRIOR TO
     CALLING, SET TEMP = # DEGS.
4610 GOSUB 3700  '  GET TEMPERATURE (CTEMP)
4620 IF FG=1 THEN PRINT "DESIRED ";TEMP; "PRESENT ";CTEMP
4630 IF CTEMP < .97 * TEMP THEN GOTO 4675
4640 IF CTEMP < 1.03 * TEMP  THEN RETURN  'NOT TOO HOT
4645 IF GAS$ = "OFF" THEN RETURN  'TOO HOT, BUT GAS IS OFF
4650 M$ = "GAS-OFF"
4660 GOSUB 3100
4670 RETURN
4675 IF GAS$ = "ON" THEN RETURN  'TOO LOW, BUT GAS IS ON
4680 M$ = "GAS-ON"
4685 GOSUB 3100
4710 RETURN
4799 '
4800 ' SUBROUTINE TO TURN OFF MOTORS & CLOSE VALVES.  THIS IS DONE FOR
     INITIALIZATION, COMPLETION OR ON ERROR COND.
4810   IF FG>1 THEN PRINT "SHUTDOWN"
4820   M$ = "GAS-OFF"
4830   GOSUB 3100
4840   M$ = "STIR-OFF"
4850   GOSUB 3100
4855   M$ = "ROTATE-OFF"
4860   GOSUB 3100
4870   FOR I = 8 TO 14  'CLOSE PINCH VALVES
4880   OUT P%,I  'CLOSE PV
4900   NEXT I
4910   OUT P%,7  'FOOD TRAY MOTOR OFF
4940   IF MF=0 THEN PRINT "COMPLETION": RETURN
4950   IF MF=1 THEN PRINT "INITIALIZATION": RETURN
```

```
4960  IF MF=2 THEN PRINT "ERROR OR MALFUNCTION - SHUTDOWN":STOP
4970  END
5000  ' SUBROUTINE TO  HEAT WOK TO TEMP SPECIFIED IN RECIPE.  SET TEMP
      = DEGS.
5010  GOSUB 3700   'GET TEMP
5020  IF CTEMP < TEMP THEN GOTO 5010    'CONTINUE HEATING
5030  RETURN
```

METHOD AND OPERATION OF THE DEVICE

In the utilization and operation of this invention, the bulk containers are filled with one cup to several quarts, depending on the expected number of orders to be prepared, of soy sauce, chicken broth, cooking oil, sherry, liquid corn starch, oyster sauce, sesame oil, etc. In a priming step performed once each day, each normally deactivated pinch valve is briefly activated to allow the respective liquid to flow into the respective hose forcing out the air in the hose between the bulk container and the pinch valve. To do this the operator, prompted by a meassage on the video display monitor, presses a key on the computer keyboard. Next, the operator, prompted by a message on the video display monitor, enters the ambient temperature of the cooking oil. This data is used by the computer control system in calculating the flow rate for the cooking oil since the flow rate is temperature dependent. At the completion of these steps, a menu is presented to the operator on the video display monitor. When an order is to be cooked, the operator selects a corresponding food tray marked with the name of the menu selection ordered and containing the precut food ingredients for that recipe. The operator mounts the food tray on the tray spindle, types the number of the menu selection on the computer keyboard, visually confirms the name of the recipe which is displayed and presses the Y key on the keyboard to start the automatic cooking. The operator is now free to initiate another order on another device of this invention. The computer control system activates the normally deactivated gas valve, igniting the gas burner and heating the wok. Temperature measurements of the wok are continually read from the digital thermometer by the computer control system. When the gas burner has heated the wok to the cooking temperature specified in the recipe the computer control system activates the normally deactivated first motor means which initiates rotation of the wok. The computer control system then activates the corresponding pinch valve to dispense cooking oil in the quantity specified for this recipe. Next, the computer control system activates the normally deactivated third motor means which initiates the stirring action of the spatula. After a few seconds, to allow the cooking oil to heat, the computer control system activates the normally deactivated second motor means to rotate the rotatable divider of the food tray to add the first food ingredient and then deactivates the second motor means. At subsequent precisely timed intervals, specified by the recipe, the computer control system rotates the rotatable divider of the food tray as above to add additional food ingredients. Additionally, the computer control system activates appropriate pinch valves to add liquid ingredients at precisely time intervals and in the precise quantities as specified in the recipe. Throughout the cooking process temperature measurements are checked approximately once every one and a half seconds to insure the proper cooking temperature is being maintained. If the temperature should rise too high, that is, if it reaches the upper limit of an allowable range, the computer control system deactivates the gas valve until the temperature drops to the lower limit of the allowable range, at which time the computer control system again activates the gas valve to turn on the gas burner. The allowable temperature range is plus or minus 3% of the temperature specified in the recipe. For example, a cooking temperature of 350° F. has an allowable range of 340° F. to 360° F. At the completion of the specified cooking time, the computer control system deactivates the first and third motor means which stops the wok rotation and the stirring action of the spatula, and deactivates the gas valve which turns off the gas burner. This signals the operator that the food is done at which time the operator scoops the food onto a dish for serving. The operator then removes the spatula and the wok and replaces them with a clean spatula and wok. The menu is automatically redisplayed on the video display monitor and the apparatus is ready to cook the next order. Although the computer program of this applicant's prototype employs a technique of counting computer cycles of known duration to determine the number of elapsed seconds for timing purposes, it is apparent that a real time clock with appropriate interface means to the computer control system could be used for precise timing control.

The method and apparatus of this invention has extreme versatility for cooking virtually any stir-fry recipe from virtually any Chinese school of cooking. Any desired food ingredients or combination of food ingredients can be added in any chosen sequence at any chosen time interval in the cooking process. Likewise, any liquid ingredient or combination of liquid ingredients can be precisely measured and added in any chosen sequence at any chosen time intervals. Furthermore, the cooking temperature can be repeatedly changed during the cooking process at any chosen time interval. The program instructions of the computer control system are designed to allow easy entry and modification of recipes. The number of recipes that can be stored is limited only by the amount of computer memory available. It is anticipated that a restaurant user of this invention might utilize anywhere from a dozen recipes to 300 or more.

To enter a new recipe the person preparing the recipe first writes the recipe on a recipe worksheet. A sample filled out recipe worksheet is shown in FIG. 6. Using the abbreviations shown at the bottom of the recipe worksheet the person lists the name of the recipe, the initial cooking temperature and then lists the food and liquid ingredients of the recipe in the sequence in which they are to be added. For each food ingredient, the person lists the cooking time desired prior to adding the next ingredient. For each liquid ingredient the person lists the quantity of the liquid ingredient to be added and the desired cooking time prior to adding the next ingredient. The person also lists any changes in cooking temperature desired for the recipe in the sequence desired. This is the essential recipe information that would be described in any Chinese cookbook.

The recipe information is then keyed from the recipe worksheet into the computer program by the person preparing the recipe. Each line is entered as a DATA statement beginning with the next available line number. For example, in the program listing, DATA statements containing recipe information occupy lines 1 to 625. Therefore, a new recipe could be entered beginning at line 626. When all recipe changes or additions have been entered, the person also updates line 1 containing the total number of recipes. If line 1 previously showed "75" recipes and 4 new recipes were entered, this line would be changed to "79". New or revised recipes are permanently stored for immediate or later use.

The components of this invention taken individually are not considered to be the particular novel portion of this invention. The novelty is believed to reside in the combined use of the components to achieve a result not anticipated by the prior art, namely, the ability of an unskilled operator to cook superior Chinese stir-fry food, and to do so with higher productivity and with a larger repetoire of multiregional recipes than the skilled traditional Chinese chef.

I claim:

1. A system for controlling the operation of a stir-fry cooking apparatus comprising:
   a rotatable food container means for holding liquid and solid foods to be cooked;
   means for rotating the food container means;
   heating means positioned beneath the food container means;
   a plurality of food dispensing means for dispensing liquid and solid foods into the container means;
   stirring manipulator means for stirring the foods in the food container means;
   first memory means for storing a plurality of recipe data;
   second memory means for storing program data for operating the heating means, the food dispensing means, and the stirring manipulator means;
   input means, connected to the first and second memory means, for inputting the recipe data into the first memory means and the program data into the second memory means;
   digital processing means, connected to the first and second memory means and the input means for controlling the operation of the heating means, the food dispensing means and the stirring manipulator means in accordance with selected recipe requirements and the program data corresponding to the selected recipe requirements stored in the first and second memories respectively.

2. An apparatus according to claim 1, further comprising:
   a display means, connected to the first and second memory means, the input means, and the digital processing means, including means for displaying data to be input to the first memory means and means for displaying the recipe selected from the first memory means.

3. An apparatus according to claim 1, wherein each recipe stored in the first memory means includes a plurality of cooking temperatures, a plurality of liquid and solid food ingredients, and a cooking time for each food.

4. An apparatus according to claim 1, wherein the digital processing means includes:
   means for electrically activating and deactivating the heating means;
   means for measuring a sensed temperature of the food container means and comparing the sensed temperature with a selected temperature set forth in a selected recipe;
   means for causing the sensed temperature to become equal to the selected recipe temperature.

5. An apparatus according to claim 1, wherein the digital processing means includes:
   means for activating and deactivating a means to rotate the food container about a vertical axis over the heating means;
   means for selectively activating and deactivating each of the plurality of food dispensing means in accordance with food quantities set forth in a selected recipe which has been stored in the first memory means;
   means for activating and deactivating the stirring manipulator to stir the solid and liquid foods in the food container means.

6. An apparatus according to claim 1, wherein the dispensing means for dispensing solid foods includes:
   a rotatable food tray, having a plurality of solid food sections divided into separate section compartments in the tray;
   means to rotate the tray so that the solid foods in each section compartment may be successively added to the food container means through a sector-shaped opening in the base of the tray.

7. An apparatus according to claim 1, wherein the dispensing means for liquid foods includes:
   liquid container means, each liquid container holding a single liquid ingredient;
   tube means connecting each of the liquid container means to a valve means;
   funnel means for receiving the liquid ingredients from each of the valves and directing the liquid ingredients into the food container means.

8. An apparatus according to claim 1, further comprising a temperature measuring means including:
   a temperature sensor positioned inside a thermocouple protection tube and biased against the exterior of the base of the food container means for sensing the temperature of the food container means;
   conversion means for receiving electrical signals from the temperature sensor and outputting digital temperature signals corresponding to the temperature of the food container means to the digital processing means.

9. An apparatus according to claim 1, wherein the stirring manipulator means includes:
   a spatula with a blade and a handle;
   a spatula arm connected pivotally to the handle of the spatula;
   a vertical reciprocating linear motion means attached to the spatula arm;
   a first driving means coupling the vertical reciprocating linear motion means to a first motor means to drive the spatula arm in a vertical reciprocating linear motion, thereby sweeping the spatula blade down the inside surface of the food container on a downward motion of the spatula arm and drawing the blade of the spatula back on an upward motion of the spatula arm;
   a cam operably attached perpendicularly to the end of a cam rod, the cam projecting horizontally to a position directly beneath the handle of the spatula, the cam rod operably mounted rotatably to a cam rod support means;

a second driving means operably coupling the cam rod to the first motor means thereby transmitting a counterclockwise rotary motion of the first motor means to a clockwise rotary motion of the cam, the cam rotating to contact and lift the spatula handle thereby lifting the blade of the spatula from the inside surface of the food container as the blade of the spatula is drawn back.

* * * * *